United States Patent
Chen et al.

(10) Patent No.: US 10,369,923 B1
(45) Date of Patent: Aug. 6, 2019

(54) OPERATION METHOD OF ADAPTIVE DRIVING BEAM HEADLAMP SYSTEM

(71) Applicant: Automotive Research & Testing Center, Lugong (TW)

(72) Inventors: Yi-Cheng Chen, Lugong (TW); Hung-Pang Lin, Lugong (TW); Yu-Lung Chang, Lugong (TW); Chun-Yao Shih, Lugong (TW)

(73) Assignee: Automotive Research & Testing Center, Lugong (TW)

( * ) Notice: Subject to any disclaimer, the term of this patent is extended or adjusted under 35 U.S.C. 154(b) by 0 days.

(21) Appl. No.: 15/966,408

(22) Filed: Apr. 30, 2018

(51) Int. Cl.
*B60Q 1/14* (2006.01)
*H05B 33/08* (2006.01)

(52) U.S. Cl.
CPC .......... *B60Q 1/143* (2013.01); *B60Q 2300/41* (2013.01); *B60Q 2300/42* (2013.01); *H05B 33/0854* (2013.01)

(58) Field of Classification Search
CPC .......... B60K 2031/0016; B60Q 1/0023; B60Q 1/08; B60Q 1/085; B60Q 1/1423; B60Q 1/143; B60Q 1/18; B60Q 1/34; B60Q 1/44; B60Q 11/005; B60Q 2300/054; B60Q 2300/056; B60Q 2300/112; B60Q 2300/114; B60Q 2300/116; B60Q 2300/122; B60Q 2300/14; B60Q 2300/20; B60Q 2300/21; B60Q 2300/312; B60Q 2300/314; B60Q 2300/32; B60Q 2300/322; B60Q 2300/33; B60Q 2300/335; B60Q 2300/336; B60Q 2300/338;

(Continued)

(56) References Cited

U.S. PATENT DOCUMENTS

| 9,738,214 B2 | 8/2017 | Nakatani | |
|---|---|---|---|
| 2012/0123648 A1* | 5/2012 | Moizard | B60Q 1/12 701/49 |

(Continued)

FOREIGN PATENT DOCUMENTS

| CN | 102381243 A | 3/2012 |
|---|---|---|
| CN | 103958272 A | 7/2014 |

(Continued)

OTHER PUBLICATIONS

Search Report and Office Action regarding Taiwanese counterpart application No. 107112994 with English Translation, issued by the TIPO dated Nov. 21, 2018, 3 pages.

*Primary Examiner* — Alexander H Taningco
*Assistant Examiner* — Renan Luque
(74) *Attorney, Agent, or Firm* — Brinks Gilson & Lione (57) ABSTRACT

An operation method of an adaptive driving beam headlamp system includes: in response to receipt of a sequence of images, when it is determined that a nearby vehicle is in the sequence of images, determining whether the nearby vehicle is in a first condition moving in a direction opposite to a moving direction of a driving vehicle and approaching the driving vehicle, or is in a second condition moving ahead of the driving vehicle in the moving direction of the driving vehicle; calculating a area into which the nearby vehicle is projected to move based on whether the nearby vehicle is in the first or the second condition; and controlling a headlamp to dim a part of a high beam pattern that corresponds with the area.

8 Claims, 9 Drawing Sheets

(58) Field of Classification Search
CPC ............ B60Q 2300/41; B60Q 2300/42; B60Q 2300/43; B60Q 2300/45; B60Q 2400/50; B60Q 2900/30; B60Q 9/00; B60Q 9/008; B60R 2300/108; B60R 2300/307; B60R 2300/8066; B60R 2300/8093; B60W 2050/143; B60W 2050/146; B60W 2520/10; B60W 2540/18; B60W 2540/20; B60W 2550/10; B60W 2550/30; B60W 30/18163; B60W 50/14; F21S 41/60; G01J 1/4228; G01S 11/12; G01S 13/931; G01S 2013/9378; G01S 5/16; G06K 9/00798; G06K 9/00805; G06K 9/00825; G06K 9/4633; G06T 2207/30252; G06T 7/001; G06T 7/248; G07C 5/008; G08G 1/04; G08G 1/166; G08G 1/16
See application file for complete search history.

(56) References Cited

U.S. PATENT DOCUMENTS

| | | | |
|---|---|---|---|
| 2012/0229028 A1* | 9/2012 | Ackermann | B60Q 1/085 315/82 |
| 2012/0271511 A1* | 10/2012 | Dierks | B60Q 1/143 701/36 |
| 2013/0177202 A1* | 7/2013 | Dierks | B60Q 1/143 382/103 |
| 2013/0332112 A1* | 12/2013 | Nakamura | G01S 17/936 702/181 |
| 2014/0022068 A1* | 1/2014 | Usami | B60Q 1/143 340/436 |
| 2014/0175978 A1* | 6/2014 | Kobayashi | B60Q 1/1423 315/82 |
| 2014/0177243 A1* | 6/2014 | Noh | B60Q 1/143 362/466 |
| 2014/0219506 A1* | 8/2014 | Foltin | G06K 9/00825 382/104 |
| 2014/0226349 A1* | 8/2014 | Morishita | G06K 9/00825 362/466 |
| 2014/0355280 A1* | 12/2014 | Fujiyoshi | B60Q 1/143 362/465 |
| 2015/0003087 A1* | 1/2015 | Futamura | B60Q 1/143 362/466 |
| 2015/0149045 A1* | 5/2015 | Mizuno | B60Q 1/1423 701/49 |
| 2016/0167566 A1* | 6/2016 | Tanaka | F21S 41/143 315/82 |
| 2017/0144585 A1* | 5/2017 | Ogawa | G06K 9/4661 |
| 2017/0144587 A1* | 5/2017 | Ogawa | B60Q 1/0023 |
| 2018/0170243 A1* | 6/2018 | Mizuno | B60Q 1/14 |

FOREIGN PATENT DOCUMENTS

| | | |
|---|---|---|
| EP | 2551155 A2 | 1/2013 |
| JP | 5941800 B2 | 6/2016 |
| JP | 6246810 B2 | 12/2017 |
| WO | WO2015005377 A1 | 1/2015 |

* cited by examiner

OPERATION METHOD OF ADAPTIVE DRIVING BEAM HEADLAMP SYSTEM

FIELD

The disclosure relates to an operating method of an adaptive driving beam headlamp system.

BACKGROUND

Conventionally, when a vehicle is being driven at night, and a headlamp thereof is operating in a high beam mode, the light beams emitted by the headlamp has a relatively high intensity, and such may cause the driver of another vehicle that comes near to experience glare when projected to the eyes of the driver, which is an undesired effect and may accompany other adverse effects such as dazzle.

An adaptive driving beam (ADB) headlamp system installed on a vehicle may be configured to change the intensity of one or more light beams emitted by the headlamp when another vehicle comes near the vehicle (e.g., an incoming vehicle), in order to prevent glare. Specifically, when the headlamp is switched to the high beam mode, a processing unit calculates a no-Glare zone based on detection of another vehicle, and controls the headlamp to produce a high beam pattern where the light projected to the no-glare zone is dimmed.

SUMMARY

One object of the disclosure is to provide an operating method of an adaptive driving beam (ADB) headlamp system that is capable of calculating a no-glare zone with increased accuracy.

According to one embodiment of the disclosure, the ADB headlamp system includes a processing unit, a headlamp for producing a high beam pattern, and a camera for capturing a sequence of images. The method includes steps of:

as the processing unit receives the sequence of images from the camera, determining, by the processing unit, whether a nearby vehicle is in the sequence of images;

when it is determined that a nearby vehicle is in the sequence of images, determining, by the processing unit, whether the nearby vehicle is in a first condition moving in a direction opposite to a moving direction of the driving vehicle and approaching the driving vehicle, or is in a second condition moving ahead of the driving vehicle in the moving direction of the driving vehicle;

calculating, by the processing unit, a set of coordinates (X, Y) of the nearby vehicle in a Cartesian coordinate system defined by the driving vehicle;

calculating, by the processing unit, a relative velocity of the nearby vehicle relative to the driving vehicle;

calculating, by the processing unit, a moving area into which the nearby vehicle is projected to move based on at least the set of coordinates and the relative velocity of the nearby vehicle, and based on whether the nearby vehicle is in the first condition or the second condition; and controlling, by the processing unit, the headlamp to dim a part of the high beam pattern that corresponds with the moving area.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
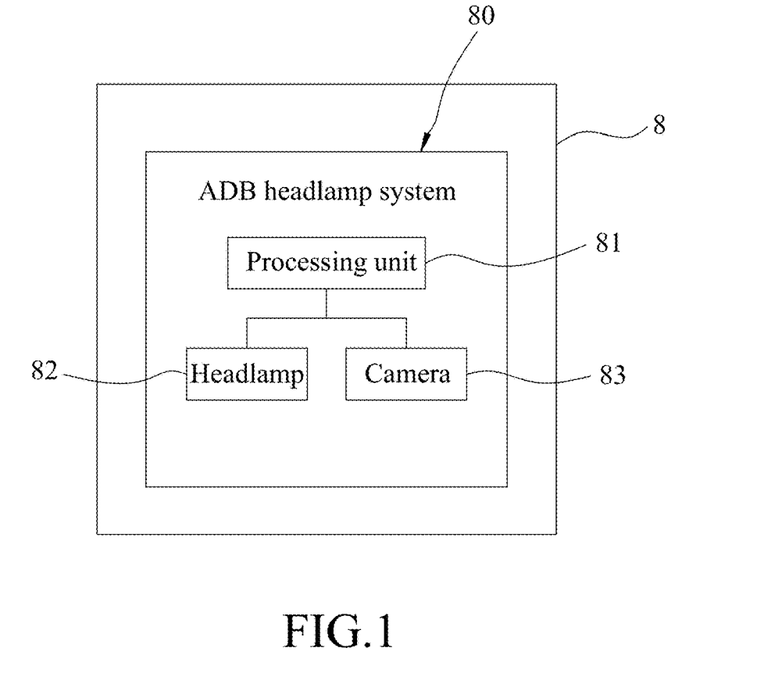
FIG. 1 is a block diagram of an adaptive driving beam (ADB) headlamp system to be installed on a vehicle, according to one embodiment of the disclosure.

FIG. 1 is a block diagram of an adaptive driving beam (ADB) headlamp system 80 to be installed on a driving vehicle 8, according to one embodiment of the disclosure. The ADB headlamp system 80 includes a processing unit 81, a headlamp 82 for producing a high beam pattern, and a camera 83 for capturing a sequence of images. For example, the processing unit 81 may be embodied using an in-vehicle processing unit, and may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RTIC), etc. The headlamp 82 is coupled to the processing unit and controlled by the processing unit 81 for producing the high beam pattern. The camera 83 may be installed on a front side of the driving vehicle 8, and is coupled to the processing unit 81 so as to provide the sequence of images thereto.

In use, the processing unit 81 is configured to, when a driver of the driving vehicle 8 switches on the headlamp 82 (e.g., by operating a dashboard control lever having several positions for controlling turn signals and low and high beams), implement an operating method for the ADB headlamp system 80 so as to control the high beam pattern generated by the headlamp 82.

Figure 2:
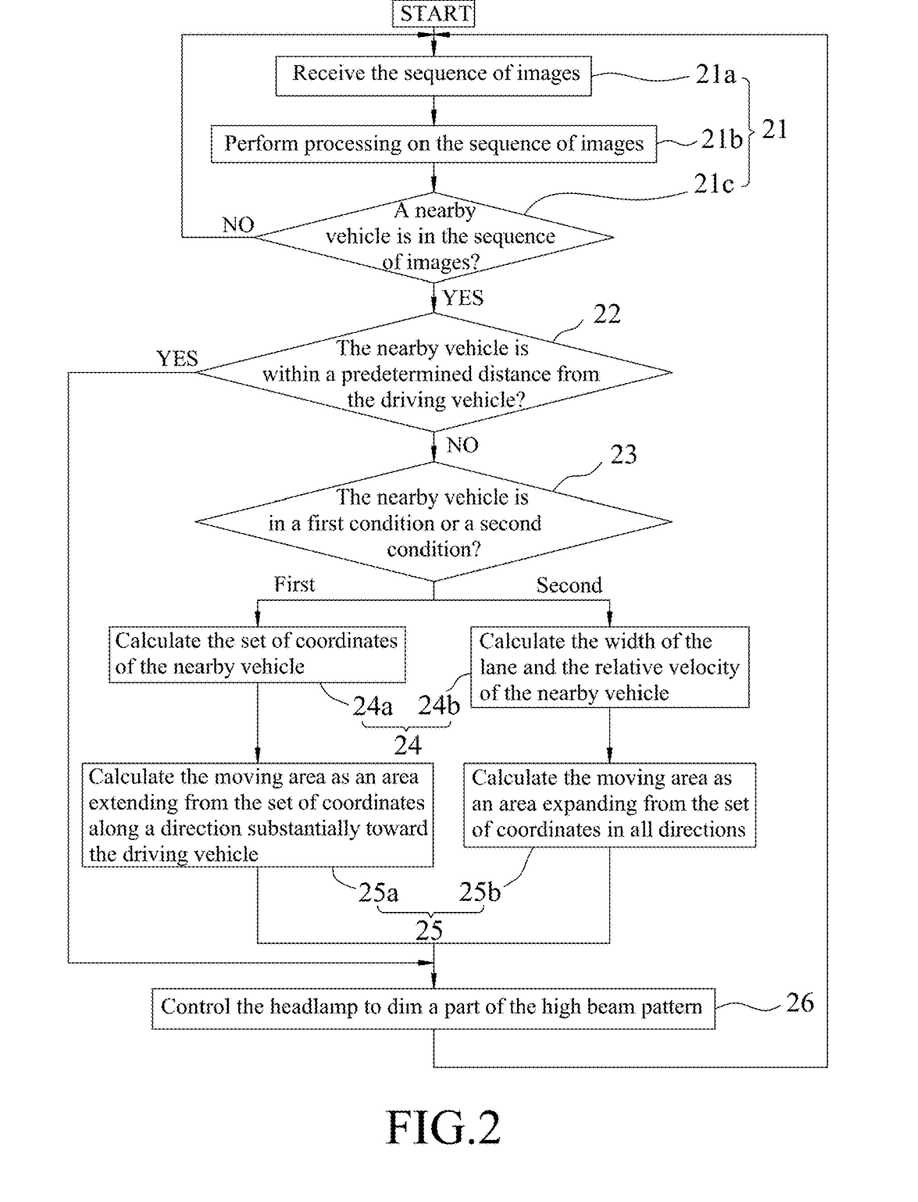
FIG. 2 is a flow chart illustrating steps of an operating method of the ADB headlamp system, according to one embodiment of the disclosure.

FIG. 2 is a flow chart illustrating steps of the operating method, according to one embodiment of the disclosure.

In step 21, as the processing unit 81 receives the sequence of images from the camera 83, the processing unit 81 determines whether a nearby vehicle is in the sequence of images.

Specifically, step 21 includes the following sub-steps.

In sub-step 21*a*, the processing unit 81 begins receiving the sequence of images.

In sub-step 21*b*, as the sequence of images is being received, the processing unit 81 performs processing on the sequence of images. In this embodiment, the processing may include dynamic image signal adjustment, setting of a region of interest (ROI), etc.

In sub-step 21*c*, the processing unit 81 determines whether a nearby vehicle is in the sequence of images. When it is determined that there is one or more nearby vehicles 9 in the sequence of images (see FIG. 3), the flow proceeds to step 22. Otherwise, the processing unit 81 continues processing the sequence of images provided by the camera 83.

It is noted that the determination is done sequentially in an image-by-image manner. That is to say, when one or more nearby vehicles 9 is detected in one of the series of the images, the flow proceeds to step 22. Otherwise, sub-step 21c is repeated for a next one of the images.

From step 22 onwards, the process is performed for each nearby vehicle 9, and the relevant discussion will be made on a per-nearby-vehicle basis.

In step 22, the processing unit 81 determines whether the nearby vehicle 9 is within a predetermined distance from the driving vehicle 8. Specifically, the processing unit 81 first calculates a distance between the driving vehicle 8 and the nearby vehicle 9, and identifies a lane in which the nearby vehicle 9 is moving.

When the distance is smaller than a predetermined distance (e.g., 30 meters), the flow proceeds to step 26, in which the processing unit 81 controls the headlamp 82 to dim a part of the high beam pattern that corresponds with the lane. This is done to prevent the light beam otherwise emitted by a normal high beam pattern from causing undesired effect such as glare to a driver of the nearby vehicle 9. Furthermore, when the nearby vehicle 9 is sufficiently close to the driving vehicle 8, it may be determined that the driver of the driving vehicle 8 is able to see the nearby vehicle 9 in the lane without the headlamp 82 emitting light with the normal high beam pattern. Accordingly, it may be adequate to control the headlamp 82 such that the part of the high beam pattern that corresponds with the lane is dimmed. When the distance is greater than the predetermined distance, the flow proceeds to step 23.

Figure 3:
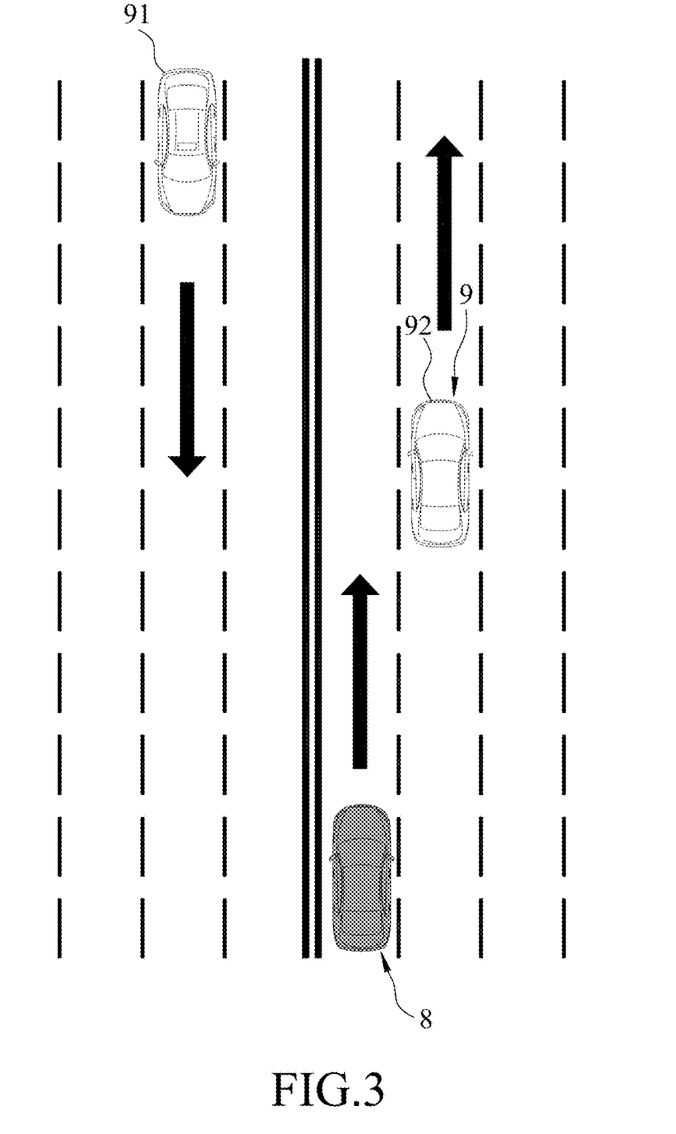
FIG. 3 illustrates two nearby vehicles moving in opposite directions.

In step 23, the processing unit 81 determines whether the nearby vehicle 9 is in a first condition, in which the nearby vehicle 9 is moving in a direction opposite to a moving direction of the driving vehicle 8 and approaching the driving vehicle 8 (e.g., the nearby vehicle 91 in FIG. 3), or is in a second condition, in which the nearby vehicle 9 is moving ahead of the driving vehicle 8 in the moving direction of the driving vehicle 8 (e.g., the nearby vehicle 92 in FIG. 3). In the example illustrated in FIG. 3, the nearby vehicle 91 is determined to be in the first condition, while the nearby vehicle 92 is determined to be in the second condition.

It is noted that the technique regarding the determination of existence of a nearby vehicle and the technique regarding the determination of the condition of each nearby vehicle 9 are known in the related art, and details thereof are omitted herein for the sake of brevity.

In step 24, based on the sequence of images, the processing unit 81 calculates a set of coordinates (X, Y) of the nearby vehicle 9 in a Cartesian coordinate system defined by the driving vehicle 8. Furthermore, the processing unit 81 calculates a width of the lane, and a relative velocity of the nearby vehicle 9 relative to the driving vehicle 8.

Specifically, in this embodiment, step 24 includes the following sub-steps.

In sub-step 24a, the processing unit 81 calculates the set of coordinates (X, Y) of the nearby vehicle 9 using the equations:

$$Y = \frac{K_v \cdot h_c - (v_c - H_c/2) \cdot h_c \cdot \tan\alpha}{(v_c - H_c/2) + K_v \cdot \tan\alpha}; \text{ and}$$

$$X = \frac{Y \cdot (u_c - W_c/2) - K_u \cdot Y \cdot \tan\beta}{K_u + (u_c - W_c/2) \cdot \tan\beta},$$

where Y represents a Y-axis coordinate of the set of coordinates of the nearby vehicle 9, $K_v$ represents a camera calibration parameter along a vertical direction, $h_c$ represents a height of a location where the camera 83 is disposed, $v_c$ represents a Y-axis coordinate of one of the images, $H_c$ represents a height of the images, a' represents an angle of depression associated with the camera 83, X represents a Y-axis coordinate of the set of coordinates of the nearby vehicle 9, $u_c$ represents a X-axis coordinate of one of the images, $W_c$ represents a width of the images, $K_u$ represents a camera calibration parameter along a horizontal direction, β represents a horizontal offset angle of the camera 83 with reference to the moving direction of the vehicle 8.

In sub-step 24b, the processing unit 81 calculates the width of the lane and the relative velocity of the nearby vehicle 9. It is noted that the calculation of the width of the lane and the relative velocity of the nearby vehicle 9 based on the series of the images are known in the art, and details thereof are omitted herein for the sake of brevity. Afterward, the flow proceeds to step 25.

In step 25, the processing unit 81 calculates a moving area into which the nearby vehicle 9 is projected to move, based on at least the set of coordinates and the relative velocity of the nearby vehicle 9, and based on whether the nearby vehicle 9 is in the first condition or the second condition.

Figure 5:
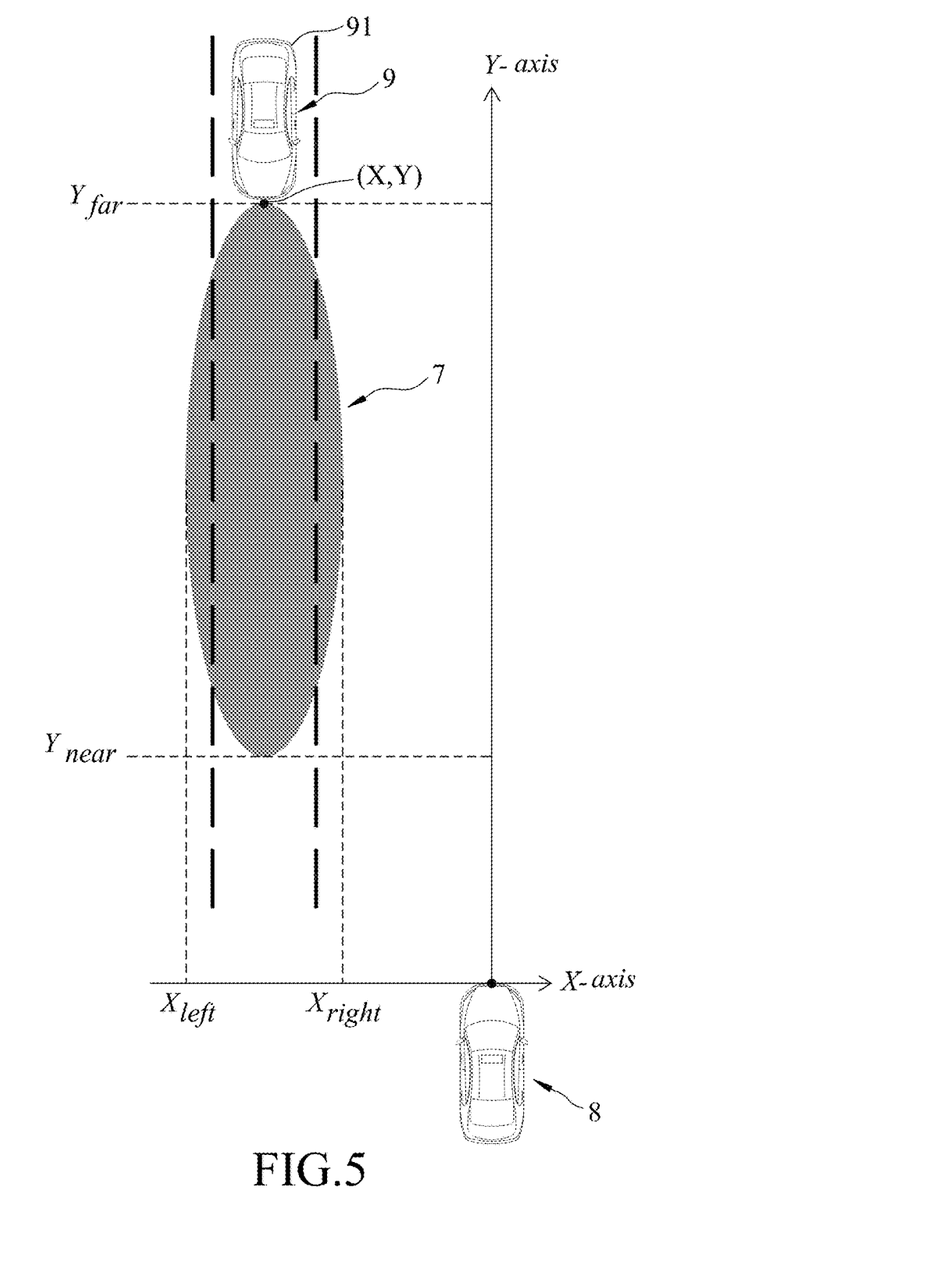
FIGS. 5 and 6 illustrate exemplary moving areas calculated respectively for the two nearby vehicles depicted in FIG. 3.

Specifically, in sub-step 25a, in the case that the nearby vehicle 9 is in the first condition (as the vehicle 91 in FIG. 3), the processing unit 81 calculates the moving area as an area extending from the set of coordinates along a direction substantially toward the driving vehicle 8 (one example is shown in FIG. 5). This is done since the nearby vehicle 91 is moving closer to the driving vehicle 8, and the moving area is assumed to be substantially between the nearby vehicle 9 and the driving vehicle 8. In the embodiment depicted in FIG. 5, the moving area 7 is in the shape of an ellipse, and the major axis of the ellipse extends parallel to the Y-axis.

Specifically, the calculating of the moving area 7 includes calculating a near edge ($Y_{near}$) and a far edge ($Y_{far}$) of the moving area 7 based on the set of coordinates (X, Y) of the nearby vehicle 91, a longitudinal component of the relative velocity of the nearby vehicle 91 in the Y-axis of the Cartesian coordinate system, and a camera calibration parameter.

Additionally, the calculating of the moving area 7 includes calculating a left edge ($X_{left}$) and a right edge ($X_{right}$) based on the set of coordinates (X, Y) of the nearby vehicle 91, a lateral velocity calibration parameter, and a lateral component of the relative velocity of the nearby vehicle 91 in the X-axis of the Cartesian coordinate system. It is noted that the moving area 7 is confined in a space that is defined by the four edges thus calculated.

In this embodiment, when it is determined that the nearby vehicle 9 is in the first condition, the far edge, the near edge, the left edge and the right edge are defined respectively by the equations $$Y_{far} = Y,$$

$$Y_{near} = Y - 2K \times V,$$

$$X_{left} = X - \frac{W}{2} - h \times U, \text{ and}$$

$$X_{right} = X + \frac{W}{2} + h \times U,$$

where $Y_{far}$ is the equation defining the far edge, $Y_{near}$ is the equation defining the near edge, Y represents the Y-axis coordinate of the set of coordinates of the nearby vehicle 9, K represents the camera calibration parameter, V represents the longitudinal component of the relative velocity, $X_{left}$ is the equation defining the left edge, $X_{right}$ is the equation defining the right edge, X represents the X-axis coordinate of the set of coordinates of the nearby vehicle 9, W represents the width of the lane, h represents the lateral velocity calibration parameter, and U represents the lateral component of the relative velocity of the nearby vehicle 9. In this embodiment, the lateral velocity calibration parameter is a constant ranging from 1.5 to 2, and is negatively correlated to a rate at which the images are captured by the camera 83 (and then processed by the unit 81).

Figure 6:
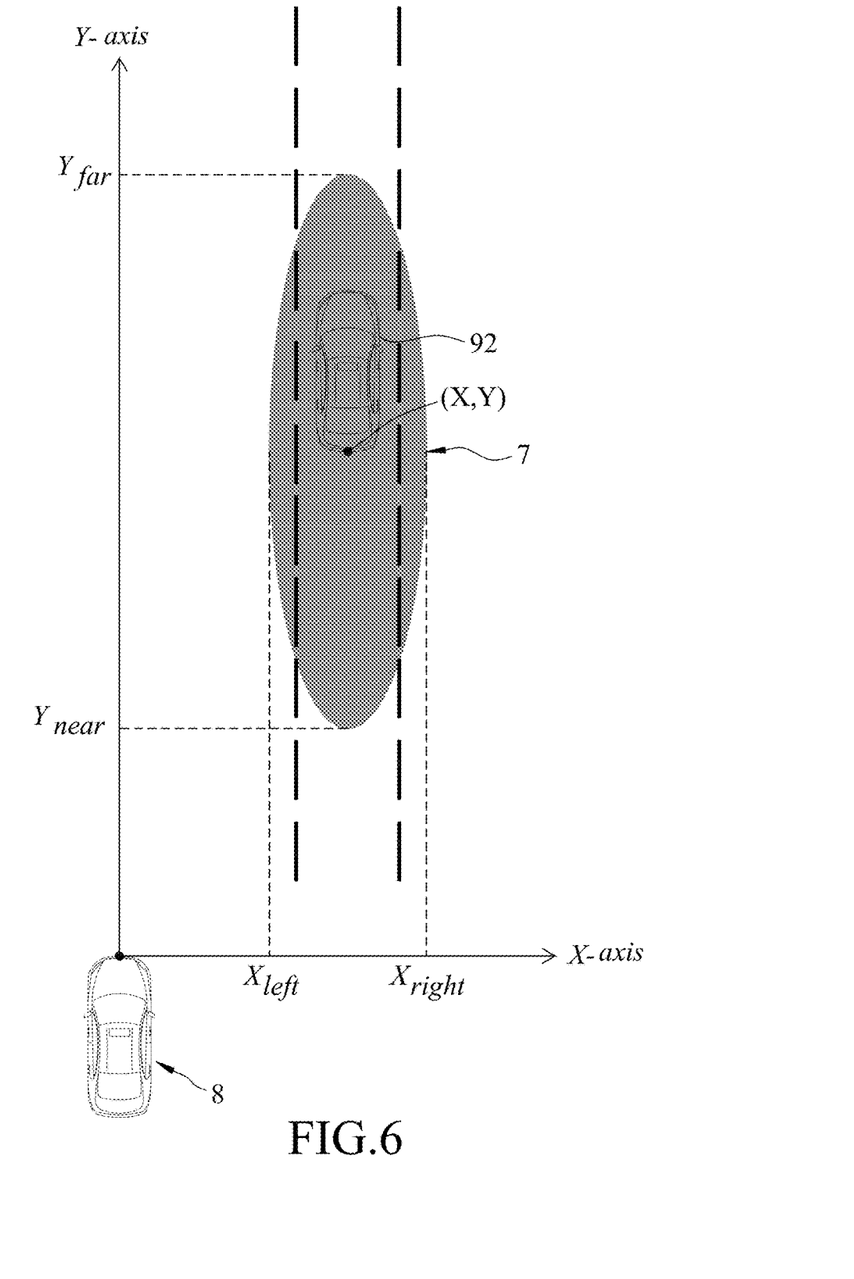

On the other hand, in sub-step 25b, in the case that the nearby vehicle 9 is in the second condition (as the vehicle 92 in FIG. 3), the processing unit 81 calculates the moving area as an area expanding from the set of coordinates (X, Y) in all directions (one example is shown in FIG. 6). This is done since the nearby vehicle 92 may be moving closer to or away from the driving vehicle 8, and as such, the moving area may be assumed to be centered at the location of the nearby vehicle 92. In the embodiment depicted in FIG. 6, the moving area 7 is in the shape of an ellipse, and the major axis of the ellipse extends parallel to the Y-axis. In this embodiment, the moving areas calculated are ellipse-shaped as seen in FIGS. 5 and 6.

Specifically, when it is determined that the nearby vehicle 92 is in the second condition, the far edge, the near edge, the left edge and the right edge are defined respectively by the equations $$Y_{far} = Y + K \times V,$$
$$Y_{near} = Y - K \times V,$$
$$X_{left} = X - \frac{W}{2} - h \times U, \text{ and}$$
$$X_{right} = X + \frac{W}{2} + h \times U,$$

Figure 7:
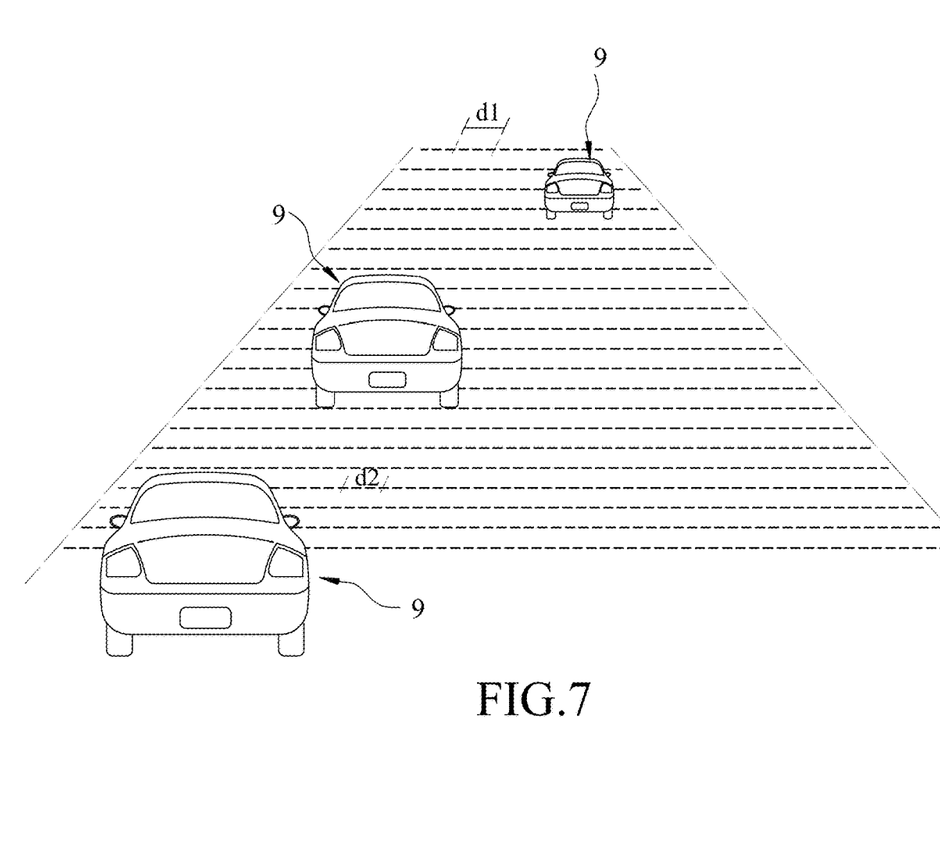
FIG. 7 illustrates an exemplary image.

It is noted that the camera calibration parameter is incorporated in the calculation of the edges of the moving area 7 in order to counteract a difference between a distance represented by a certain number of pixels on an upper part of a specific image and a distance represented by the same number of pixels on a lower part of the specific image. As shown in FIG. 7 illustrating a specific image, an actual distance represented by two points between three consecutive dashes on the upper part of the image (e.g., the distance d) is significantly larger than that represented by two points between three consecutive dashes on the lower part of the image (e.g., the distance $d_2$) despite that $d_1$ and $d_2$ may be represented by a same number of pixels.

Figure 4:
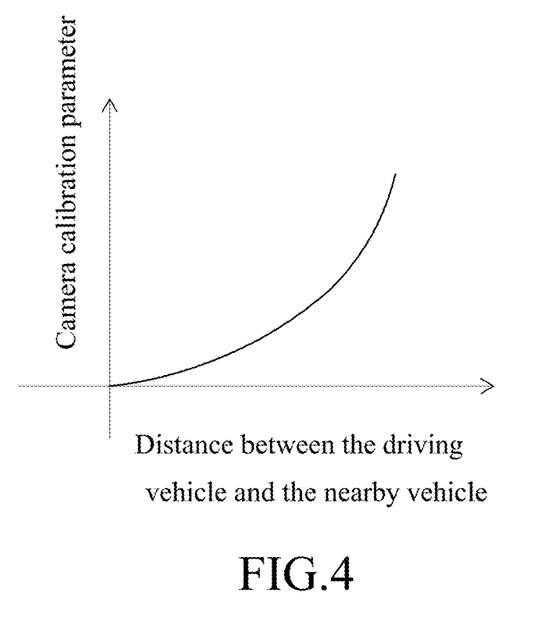
FIG. 4 illustrates a relationship between a camera calibration parameter and a distance between a nearby vehicle and a driving vehicle.

Under such a condition, calculation of the set of coordinates (X, Y) and the lateral component of the relative velocity of the nearby vehicle 9 may have errors without using the camera calibration parameter, and when the nearby vehicle 9 is located at the upper part of the image. FIG. 4 illustrates a relationship between a value of the camera calibration parameter and the distance between the nearby vehicle 9 and the driving vehicle 8. It is noted that in addition to being positively correlated to a distance between the driving vehicle 8 and the nearby vehicle 9, the camera calibration parameter is further related to a type of the camera 83 and is negatively correlated to the rate at which the images are captured.

By applying different calculations based on the condition of the nearby vehicle 9, the moving area 7 may be calculated with more accuracy.

In step 26, the processing unit 81 controls the headlamp 82 to dim a part of the high beam pattern that corresponds with the moving area 7 on the lane (this part is hereinafter referred to as a "dimmed part"), such that the dimmed part has reduced brightness (e.g., reduced luminous intensity) comparison with its original brightness. This may be done by transmitting a signal to the headlamp 82 that includes data related to the moving area 7. In response, the high beam pattern produced by the headlamp 82 is changed such that light projected to the dimmed part is lower in intensity compared to other parts of the high beam pattern. In this configuration, the driver of the driving vehicle 8 is still able to see other parts illuminated by the high beam pattern clearly while preventing the driver of the nearby vehicle 9 from having the unwanted effect of glare, and the dimmed part may be said to correspond with a no-glare zone.

In some embodiments, the processing unit 81 determines whether the nearby vehicle 9 has left the moving area 7 for longer than a predetermined time duration (e.g., 1 or 2 seconds). When it is determined that the nearby vehicle 9 has left the moving area 7 for longer than the predetermined time duration, the processing unit 81 controls the headlamp 82 to restore the brightness of the dimmed part to the original brightness. That is to say, the dimmed part is cancelled, and the process may be repeated from the start. Otherwise, the processing unit 81 controls the headlamp 82 to maintain the dinned part in the dinned state (i.e., at the reduced brightness) until it is determined that the nearby vehicle 9 has left the moving area 7 for longer than the predetermined time duration. In that case, the flow also proceeds to process a next image in the sequence of the images.

In this embodiment, the processing unit 81 controls the headlamp 82 to maintain the dimmed part in the dimmed state until it is determined that the nearby vehicle 9 has left the moving area 7 for longer than the predetermined time duration, instead of until it is merely determined that the nearby vehicle 9 has left the moving area 7, to prevent cancelling the dimmed part when the nearby vehicle 9 that is actually still in the moving area 7 becomes undetected by the camera 83, and therefore not captured in the images, due to being temporarily blocked by an obstacle (e.g., a tree, a fence, etc.) located between the camera 83 and the nearby vehicle 9. Without the means of the predetermined time duration, the dimmed part may be cancelled prematurely while the nearby vehicle 9 is still in the moving area 7. Additionally, if the dimmed part is cancelled prematurely, once the nearby vehicle 9 is no longer blocked, the headlamp 82 may be controlled to again dim the dimmed part, creating a blinking effect due to rapid changing of luminous intensity in the moving area 7.

Figure 8:
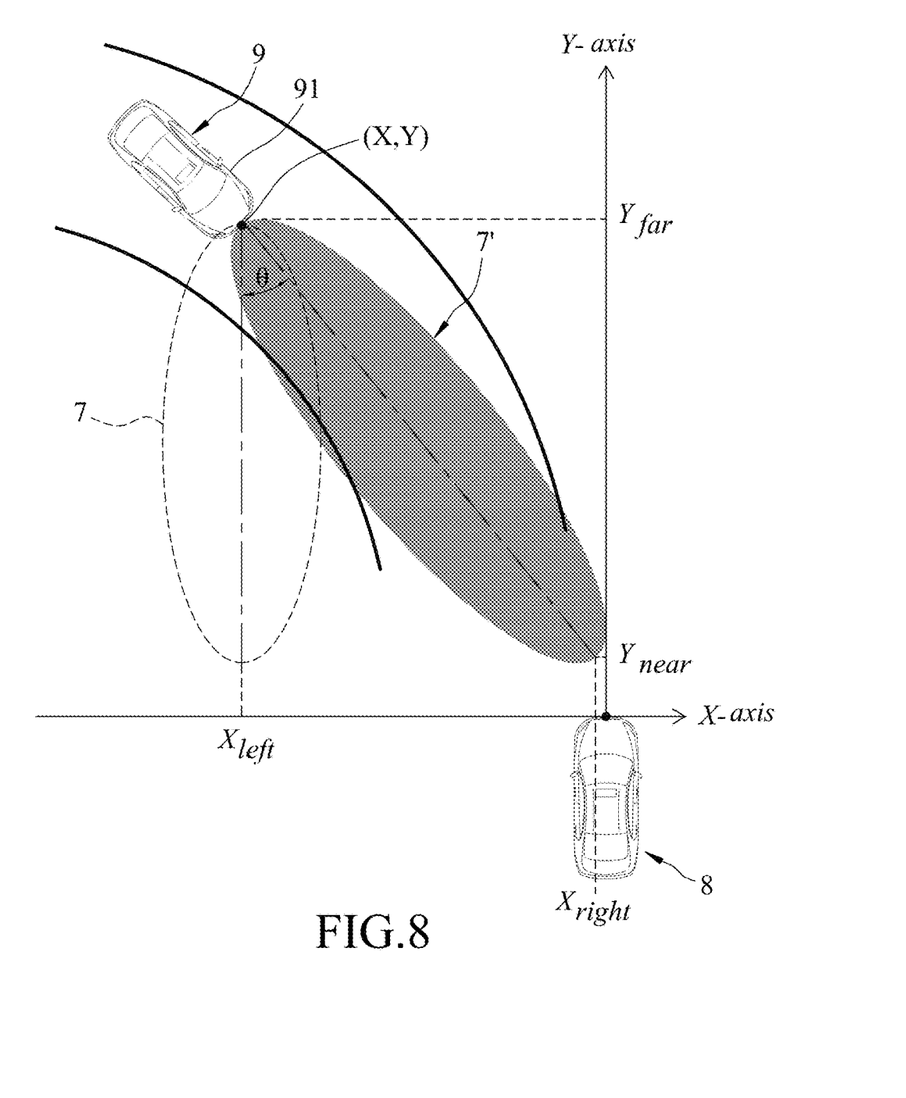
FIGS. 8 and 9 each illustrate an original moving area (bounded by a dashed line) and an adjusted moving area (represented by a shadowed area) for a respective one of the nearby vehicles.

In one embodiment, in cases that the lane in which the nearby vehicle 9 is moving is curved (see FIGS. 8 and 9), the calculation of the moving area 7 may be adjusted. Specifically, the processing unit 81 calculates a curvature θ of the lane in which the nearby vehicle 9 is moving. For example, as shown in FIG. 8, the curvature θ of the lane may be an angle defined by a straight line extending from the set of coordinates (X, Y) in a forward direction viewing from the nearby vehicle 9 and a line parallel to the Y-axis of the Cartesian coordinate system, as illustrated in FIG. 8.

When the curvature θ of the lane is greater than a predetermined threshold degree (e.g., 10 degrees), the moving area 7 is calculated further based on the curvature of the lane. Specifically, when it is determined that the lane is curved, it may be deduced that movements of the nearby vehicle 9 may be different from that when in a straight lane, and therefore the location of the moving area 7 may be adjusted accordingly.

In this embodiment, after the curvature θ of the lane is calculated, the processing unit 81 may define an adjusted moving area 7' by rotating, while a point of the set of coordinates (X, Y) is fixed, the major axis of the (elliptical) moving area 7 by an angle corresponding with the curvature θ to serve as the major axis of the (also elliptical) adjusted moving area 7', and calculating edges of the adjusted moving area 7'. For example, the angle may be identical to the curvature θ.

It is noted that, with the nearby vehicle 9 in different conditions, different calculations are used for determining the edges of the adjusted moving area 7'.

Specifically, in the first condition, the edges of the adjusted moving area 7' are calculated using the following equations:

$$Y_{far} = Y$$
$$Y_{near} = Y - 2K*V$$
$$X_{left} = X$$
$$X_{right} = X + S*2KV*\tan\theta$$

where S represents a slope of the straight line in the Cartesian coordinate system.

In the second condition, the edges of the adjusted moving area 7' are calculated using the following equations.

$$Y_{far} = Y + K*V$$
$$Y_{near} = Y - K*V$$
$$X_{left} = X - S*KV*\tan\theta$$
$$X_{right} = X + S*KV*\tan\theta$$

Figure 9:
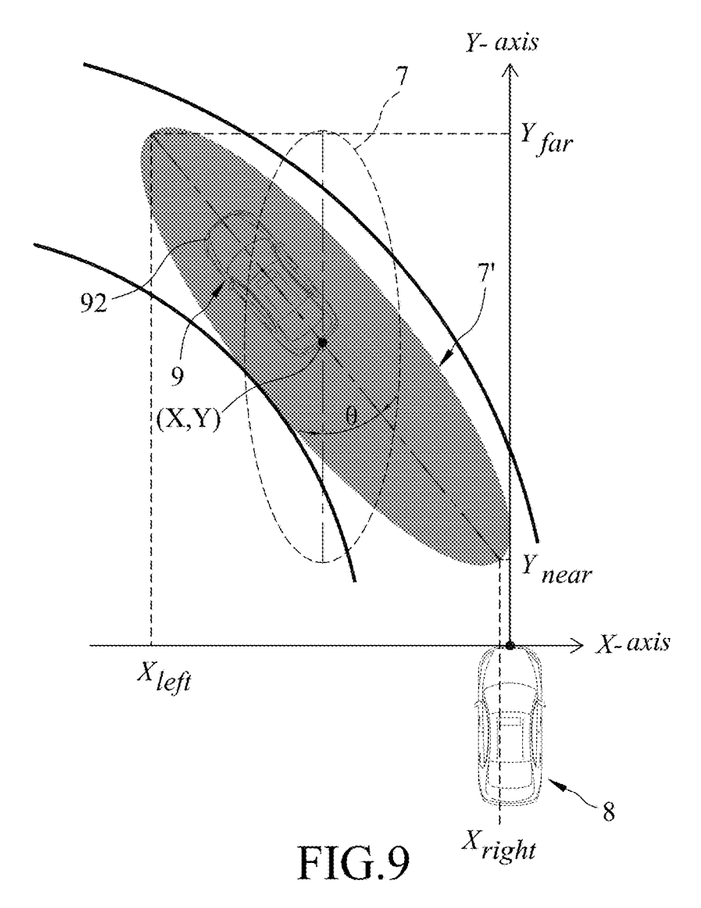

FIGS. 8 and 9 illustrate the original moving area 7 (bounded by a dashed line) and the adjusted moving area 7' (represented by a shadowed area) for the nearby vehicle 9 in the first condition and the second condition, respectively.

To sum up, by applying different calculations to obtain the moving areas 7, 7' and by taking into consideration the specific condition of the nearby vehicle 9 with reference to the driving vehicle 8, the moving areas 7, 7' thus obtained may better reflect a probable area into which the nearby vehicle 9 may move.

Moreover, embodiments of the disclosure further incorporate the use of numerous new ways to further enhance the accuracy of the calculations. For example, the camera calibration parameter is included to enhance the accuracy on calculating a distance based on the image. Furthermore, when it is determined that the lane in which the nearby vehicle 9 is moving is curved, the location of the moving area 7 is adjusted accordingly.

In occasions where it is determined that a part of the beam pattern should be dimmed (e.g., when the nearby vehicle 9 is in proximity to the driving vehicle 8), the processing unit 81 may control the headlamp 82 to produce a high beam pattern with the part being dimmed (the part becoming a no-glare zone). This may reduce the chances of the driver of the nearby vehicle 9 being dazzled, while allowing the driver of the driving vehicle 8 to clearly see other parts of the road.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An operation method of an adaptive driving beam (ADB) headlamp system installed on a driving vehicle, the ADB headlamp system including a processing unit, a headlamp for producing a high beam pattern, and a camera for capturing a sequence of images, the method comprising steps of:
    as the processing unit receives the sequence of images from the camera, determining, by the processing unit, whether a nearby vehicle is in the sequence of images;
    when it is determined that a nearby vehicle is in the sequence of images, determining, by the processing unit, whether the nearby vehicle is in a first condition moving in a direction opposite to a moving direction of the driving vehicle and approaching the driving vehicle, or is in a second condition moving ahead of the driving vehicle in the moving direction of the driving vehicle;
    calculating, by the processing unit, a set of coordinates (X, Y) of the nearby vehicle in a Cartesian coordinate system defined by the driving vehicle;
    calculating, by the processing unit, a relative velocity of the nearby vehicle relative to the driving vehicle;
    calculating, by the processing unit, a moving area into which the nearby vehicle is projected to move based on at least the set of coordinates and the relative velocity of the nearby vehicle, and based on whether the nearby vehicle is in the first condition or the second condition; and
    controlling, by the processing unit, the headlamp to dim a part of the high beam pattern that corresponds with the moving area;
    wherein, in the step of calculating a moving area:
        when it is determined that the nearby vehicle is in the first condition, the moving area is calculated as an area extending from the set of coordinates along a direction substantially toward the driving vehicle; and when it is determined that the nearby vehicle is in the second condition, the moving area is calculated as an area expanding from the set of coordinates in all directions;

wherein the step of calculating a moving area is to calculate the moving area further based on a camera calibration parameter that is positively correlated to a distance between the driving vehicle and the nearby vehicle, and a lateral velocity calibration parameter that is related to a lateral component of the relative velocity of the nearby vehicle in an X-axis of the Cartesian coordinate system.

2. The operation method of claim 1, wherein the step of calculating a moving area includes calculating a near edge ($Y_{near}$) and a far edge ($Y_{far}$) of the moving area based on the set of coordinates (X, Y) of the nearby vehicle, a longitudinal component of the relative velocity of the nearby vehicle in a Y-axis of the Cartesian coordinate system, and a camera calibration parameter.

3. The operation method of claim 2, wherein, in the step of calculating a moving area:

when it is determined that the nearby vehicle is in the first condition, the far edge and the near edge are defined respectively by equations $$Y_{far} = Y, \text{ and}$$
$$Y_{near} = Y - 2K \times V$$

where $Y_{far}$ is an equation defining the far edge, $Y_{near}$ is an equation defining the near edge, Y represents a Y-axis coordinate of the set of coordinates of the nearby vehicle, K represents the camera calibration parameter, and V represents the longitudinal component of the relative velocity; and when it is determined that the nearby vehicle is in the second condition, the far edge and the near edge are defined respectively by equations $$Y_{far} = Y + K \times V, \text{ and}$$
$$Y_{near} = Y - K \times V.$$

4. The operation method of claim 1, wherein the step of calculating a moving area includes calculating a left edge ($X_{left}$) and a right edge ($X_{right}$) based on the set of coordinates (X, Y) of the nearby vehicle, a lateral velocity calibration parameter, and a lateral component of the relative velocity of the nearby vehicle in an X-axis of the Cartesian coordinate system.

5. The operation method of claim 4, further comprising a step of obtaining, by the processing unit, a width of a lane in which the nearby vehicle is moving by analyzing the sequence of images, wherein the left edge ($X_{left}$) and the right edge ($X_{right}$) are defined respectively by equations $$X_{left} = X - \frac{W}{2} - h \times U, \text{ and}$$
$$X_{right} = X + \frac{W}{2} + h \times U$$

where $X_{left}$ is an equation defining the left edge, $X_{right}$ is an equation defining the right edge, X represents an X-axis coordinate of the set of coordinates of the nearby vehicle, W represents the width of the lane, h represents the lateral velocity calibration parameter, and U represents the lateral component of the relative velocity of the nearby vehicle.

6. The operation method of claim 1, further comprising, after the step of controlling the headlamp to dim a part:

determining, by the processing unit, whether the nearby vehicle has left the moving area for longer than a predetermined time duration; and controlling, by the processing unit, the headlamp to maintain the part in a dimmed state until it is determined that the nearby vehicle has left the moving area for longer than the predetermined time duration.

7. The operation method of claim 1, further comprising, after determining that a nearby vehicle is in the sequence of images:

by the processing unit, calculating a distance between the driving vehicle and the nearby vehicle and identifying a lane in which the nearby vehicle is moving; and when the distance is smaller than a predetermined threshold value, controlling, by the processing unit, the headlamp to dim a part of the high beam pattern that corresponds with the lane.

8. The operation method of claim 1, further comprising, after determining that a nearby vehicle is in the sequence of images:

identifying, by the processing unit, a lane in which the nearby vehicle is moving; and calculating, by the processing unit, a curvature of the lane;

wherein, when the curvature of the lane is larger than a predetermined threshold degree, the moving area is calculated further based on the curvature of the lane.

* * * * *